UNITED STATES PATENT OFFICE.

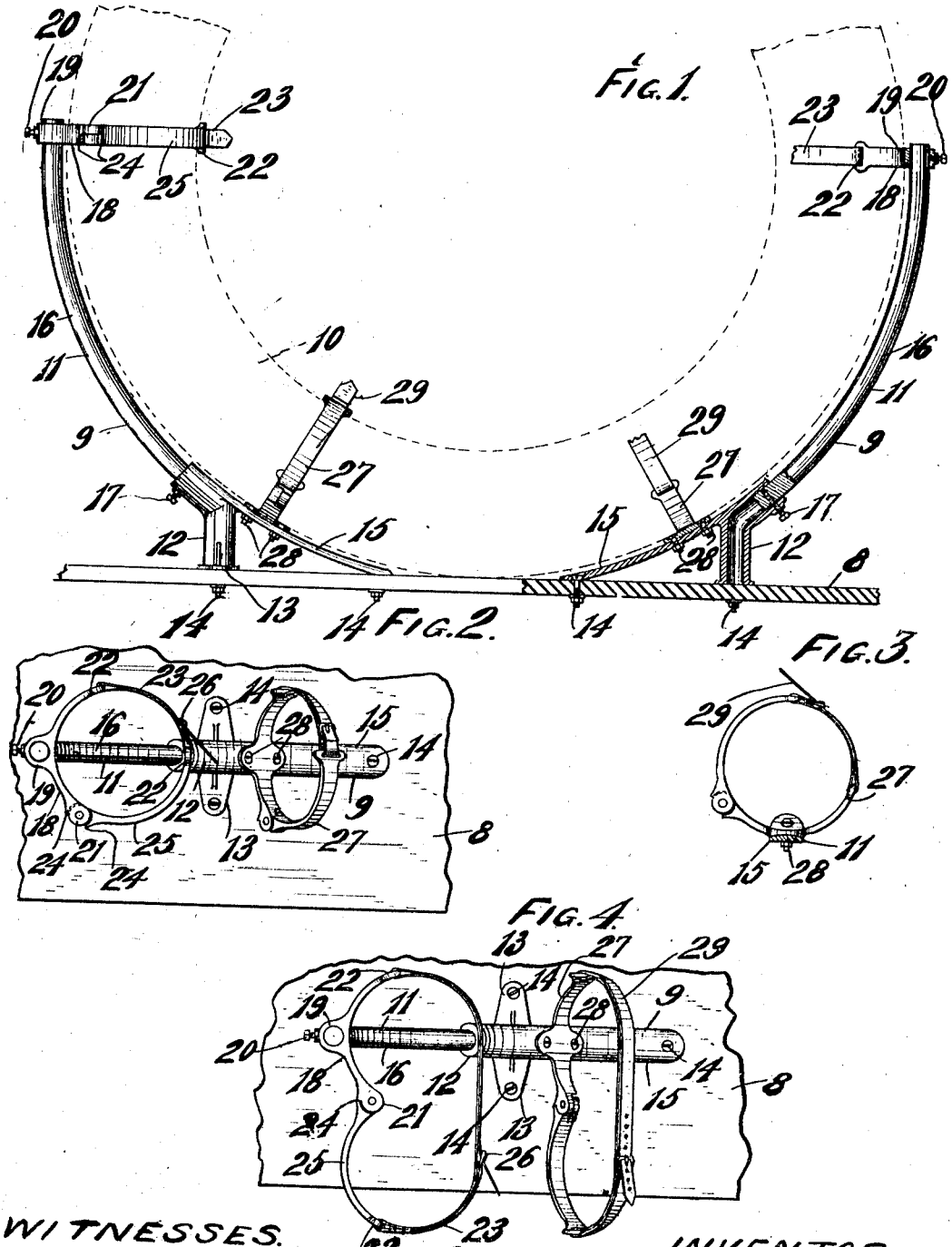

ANDREAS M. SÖNNICHSEN, OF MILWAUKEE, WISCONSIN, ASSIGNOR TO AUTO PARTS MANUFACTURING COMPANY, A CORPORATION OF WISCONSIN.

TIRE-HOLDER.

1,018,590. Specification of Letters Patent. Patented Feb. 27, 1912.

Application filed June 1, 1911. Serial No. 630,557.

*To all whom it may concern:*

Be it known that I, ANDREAS M. SÖNNICHSEN, a citizen of the United States, and resident of Milwaukee, in the county of Milwaukee and State of Wisconsin, have invented new and useful Improvements in Tire-Holders, of which the following is a description, reference being had to the accompanying drawings, which are a part of this specification.

This invention relates to improvements in tire holders more particularly adapted for use in holding extra automobile tires on the foot boards of automobiles.

It is one of the objects of this invention to provide a tire holder which is simple in construction and is inexpensive to manufacture and which may be easily attached to the foot boards of an automobile.

A further object of the invention is to provide a tire holder to which tires may be easily attached and detached and when attached are securely held against accidental detachment.

A further object of the invention is to provide a tire holder which may be adjusted to hold tires of different sizes and also adjusted to hold one or two tires.

With the above, and other objects in view, the invention consists of the tire holder and its parts and combinations as set forth in the claim, and all equivalents thereof.

In the accompanying drawing in which the same reference characters indicate the same parts in all of the views; Figure 1 is a side view of a tire and the holder, shown mounted on a foot board of an automobile, parts of the holder and the foot board being in section and the automobile tire represented by dotted lines; Fig. 2 is a top view of a portion of the foot board and one part of the pair of holders; Fig. 3 is a detailed view of one of the holding bands; and, Fig. 4 is a top view of a portion of the foot board and one part of the holder with the holding bands expanded to accommodate two tires.

Referring to the drawing the numeral 8 indicates an ordinary foot board of an automobile, 9 the holder mounted thereon and 10 the tire supported in the holder.

The holder 9 comprises two like arc-shaped parts 11 which are adapted to be spaced a distance apart and fastened to the foot board to form a semi-circle shape corresponding in size to the diameter of the tire or tires supported thereby.

Each part 11 is formed of a tubular bracket 12 provided with transverse apertured flanges 13 to accommodate the bolts 14 which extend through the foot board to fasten the bracket thereto. The bracket is also provided with a downwardly curved extension 15 which terminates on a plane in line with the lower face of the transverse flanges. The lower end of extension is apertured to take one of the fastening bolts 14 and thus provide means at three points for rigidly fastening the bracket to the foot board.

A curved band holding member 16 extending into the upper open end of the tubular bracket 12 and fastened thereto by the bolt 17 adjustably carries on its upper end portion the tire engaging band 18. This band is provided with an eyed part 19 through which the curved rod extends and the band is adjustably fastened thereto by the bolt 20. The band is formed of two arc-shaped members connected together at one end by a hinge joint 21 and having loops 22 formed in their opposite ends through which extends the strap 23. The hinge joint is provided with stop shoulders 24 to limit the outward swing of the movable arc-shaped member 25 when it is desired to hold two tires in the holder. These hinge shoulders are so positioned that when the movable member is swung outwardly it will stop in the same position relatively as the fixed arc-shaped member so that two tires may be placed alongside of each other in the holder. The strap 23 is provided with a buckle 26, and when the holder supports two tires a longer strap is substituted for the strap used for holding a single tire.

A tire engaging band 27 similar to the band 18 is rigidly fastened to the curved extension 15 by bolts 28 and this band is also provided with a strap 29 extending through its loops.

In use the two parts of the holder are spaced apart and bolted to the foot board of an automobile with the forward extensions projecting toward each other. The two parts are spaced apart a proper distance to conform to the radius of the tire and the tire is then placed in the bends of the bands and the straps thereof looped around the tire and buckled to securely hold the same in place. If it is desired to hold two tires the movable hinged members are swung outwardly to provide bends for holding two tires and longer straps are substituted for the short ones and the tires are then securely bound by the said straps.

From the foregoing description it will be seen that the holder is very simple in construction and is well adapted to hold one or two tires.

What I claim as my invention is:

A tire holder, comprising a pair of independent tubular brackets provided with curved extensions terminating in support engaging means, said extensions projecting downwardly and in a direction toward each other, said brackets also provided with support engaging means, curved members extending into the bores of the tubular brackets and rigidly connected thereto, said brackets adapted to be adjusted toward or away from each other to accommodate tires of different diameters, and means carried by the brackets and the curved members for connecting a tire thereto.

In testimony whereof, I affix my signature, in presence of two witnesses.

ANDREAS M. SÖNNICHSEN.

Witnesses:
C. H. KEENEY,
A. E. THOMAS.

Copies of this patent may be obtained for five cents each, by addressing the "Commissioner of Patents, Washington, D. C."